US006363314B1

(12) United States Patent
Hafner et al.

(10) Patent No.: US 6,363,314 B1
(45) Date of Patent: Mar. 26, 2002

(54) METHOD AND APPARATUS FOR TRIMMING A FUEL INJECTOR

(75) Inventors: Gregory G. Hafner, Columbia, SC (US); Brian G. McGee, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/616,001

(22) Filed: Jul. 13, 2000

(51) Int. Cl.[7] ...................... F02M 37/04; G01M 15/00; G01M 19/00

(52) U.S. Cl. ...................... 701/104; 123/446; 73/119 A

(58) Field of Search ................................ 123/446, 447, 123/456, 494; 701/103, 104, 105; 73/119 A

(56) References Cited

U.S. PATENT DOCUMENTS

| | | | | |
|---|---|---|---|---|
| 4,571,683 A | | 2/1986 | Kobayashi et al. | |
| 4,576,135 A | | 3/1986 | Johnson | |
| 4,621,599 A | | 11/1986 | Igashira et al. | |
| 4,704,999 A | | 11/1987 | Hashikawa et al. | |
| 4,712,421 A | * | 12/1987 | Young | 73/119 A |
| 4,729,056 A | | 3/1988 | Edwards et al. | |
| 4,788,858 A | * | 12/1988 | Liebermann | 73/119 A |
| 4,836,161 A | | 6/1989 | Abthoff et al. | |
| 4,922,878 A | | 5/1990 | Shinogle et al. | |
| 5,020,362 A | * | 6/1991 | Hart et al. | 73/119 A |
| 5,020,979 A | | 6/1991 | Askew | |
| 5,070,836 A | | 12/1991 | Wahl et al. | |
| 5,113,833 A | | 5/1992 | Nagano et al. | |
| 5,157,967 A | * | 10/1992 | Wieczorek | 73/119 A |
| 5,241,858 A | * | 9/1993 | Wieczorek et al. | 73/119 A |
| 5,245,972 A | | 9/1993 | Denz et al. | |
| 5,267,545 A | | 12/1993 | Kitson | |
| 5,268,842 A | | 12/1993 | Martson et al. | |
| 5,277,164 A | | 1/1994 | Takahashi et al. | |
| 5,320,079 A | | 6/1994 | Kuwabara | |
| 5,379,733 A | | 1/1995 | Haddick et al. | |
| 5,427,072 A | | 6/1995 | Udo | |
| 5,427,083 A | | 6/1995 | Ahern | |
| 5,450,829 A | | 9/1995 | Beck | |
| 5,460,128 A | | 10/1995 | Kruse | |
| 5,492,098 A | | 2/1996 | Hafner et al. | |
| 5,499,608 A | | 3/1996 | Meister et al. | |
| 5,507,260 A | | 4/1996 | Hintzen | |
| 5,540,205 A | | 7/1996 | Davis et al. | |
| 5,549,092 A | | 8/1996 | Hasegawa et al. | |
| 5,566,650 A | | 10/1996 | Kruse | |
| 5,566,660 A | | 10/1996 | Camplin et al. | |
| 5,588,415 A | | 12/1996 | Ahern | |
| 5,609,131 A | | 3/1997 | Gray, Jr. et al. | |
| 5,634,448 A | | 6/1997 | Shinogle et al. | |
| 5,641,981 A | * | 6/1997 | Frankl et al. | 73/119 A |
| 5,647,317 A | | 7/1997 | Weisman, II et al. | |
| 5,678,521 A | | 10/1997 | Thompson et al. | |
| 5,685,273 A | | 11/1997 | Johnson et al. | |
| 5,701,870 A | | 12/1997 | Gottshall et al. | |
| 5,704,336 A | | 1/1998 | Wrobel | |
| 5,722,373 A | | 3/1998 | Paul et al. | |
| 5,732,680 A | | 3/1998 | Ninomiya et al. | |
| 5,740,775 A | | 4/1998 | Suzuki et al. | |

(List continued on next page.)

FOREIGN PATENT DOCUMENTS

EP 0 221 832 A2 5/1987

OTHER PUBLICATIONS

SAE Feb. 24–27, 1997 A New Concept for Low Emission Diesel Combusion—Printed from Diesel Engine Combustion Processes and Emission Control Technologies (SP–1246).

*Primary Examiner*—Willis R. Wolfe

(57) ABSTRACT

A system and method for trimming a fuel injector using a fuel injection system simulator to test the injector at selected simulated engine operating conditions, the system simulator including an electronic controller in electrical communication with the injector, the electronic controller being operable to detect and, optionally, record the resultant performance characteristics of the trimmed injector for future reference.

20 Claims, 4 Drawing Sheets

U.S. PATENT DOCUMENTS

| | | | | |
|---|---|---|---|---|
| 5,740,776 | A | | 4/1998 | Enderle et al. |
| 5,746,183 | A | | 5/1998 | Parke et al. |
| 5,778,850 | A | | 7/1998 | Buratti et al. |
| 5,794,585 | A | | 8/1998 | Yonezawa et al. |
| 5,803,049 | A | | 9/1998 | Harcombe |
| 5,832,901 | A | | 11/1998 | Yoshida et al. |
| 5,839,275 | A | | 11/1998 | Hirota et al. |
| 5,865,153 | A | | 2/1999 | Matsumoto |
| 5,865,158 | A | | 2/1999 | Cleveland et al. |
| 5,893,347 | A | | 4/1999 | McGee et al. |
| 5,979,398 | A | | 11/1999 | Yanagihara |
| 5,979,412 | A | | 11/1999 | Werner |
| 5,986,871 | A | | 11/1999 | Forck et al. |
| 6,000,384 | A | | 12/1999 | Brown et al. |
| 6,006,727 | A | | 12/1999 | Katashiba et al. |
| 6,009,849 | A | | 1/2000 | Yamanoto et al. |
| 6,014,956 | A | | 1/2000 | Cowden et al. |
| 6,021,370 | A | | 2/2000 | Bellinger et al. |
| 6,026,780 | A | | 2/2000 | Barnes et al. |
| 6,032,642 | A | | 3/2000 | Trumbower et al. |
| 6,044,824 | A | | 4/2000 | Mamiya et al. |
| 6,085,142 | A | * | 7/2000 | Di Leo et al. .............. 701/104 |
| 6,102,005 | A | * | 8/2000 | Kasen et al. ................ 123/446 |
| 6,112,720 | A | * | 9/2000 | Matta ......................... 123/446 |

* cited by examiner

METHOD AND APPARATUS FOR TRIMMING A FUEL INJECTOR

TECHNICAL FIELD

This invention relates generally to electronically controlled fuel injectors and, more particularly, to a method and apparatus for trimming, i.e., determining and recording for future use data associated with the operating characteristics of a fuel injector prior to installation into an engine, the injector being operable to deliver multiple fuel shots during a fuel injection event.

BACKGROUND ART

Electronically controlled fuel injectors are well known in the art including hydraulically actuated and mechanically actuated electronically controlled fuel injectors. An electronically controlled fuel injector typically injects fuel into a specific engine cylinder as a function of an injection signal received from an electronic controller. These signals include waveforms that are indicative of a desired injection rate as well as the desired timing and quantity of fuel to be injected into the cylinders.

Emission regulations pertaining to engine exhaust emissions are increasingly becoming more restrictive throughout the world including, for example, restrictions on the emission of hydrocarbons, carbon monoxide, particulate and nitrogen oxides ($NO_x$). Tailoring the number and the parameters of the injection fuel shots during a particular injection event are ways in which to control emissions and meet such emission standards. As a result, techniques for generating split or multiple fuel injections during an injection event have been utilized to modify the burn characteristics of the combustion process in an attempt to reduce emissions and noise levels. Generating multiple injections during an injection event typically involves splitting the total fuel delivery to the cylinder during a particular injection event into two or more separate fuel injections, generally referred to as a pilot injection fuel shot, a main injection fuel shot and/or an anchor injection fuel shot. As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine. At different engine operating conditions, it may be necessary to use different injection strategies in order to achieve both desired engine operation and emissions control.

In the past, the controllability of split or multiple injections has been somewhat restricted by mechanical and other limitations associated with the particular types of injectors utilized. For example, when delivering a split or multiple injection current waveform to a plurality of fuel injectors, some injectors will actually deliver the split fuel delivery to the particular cylinder whereas some injectors will deliver a boot fuel delivery. A boot type of fuel delivery generates a different quantity of fuel as compared to a split type fuel delivery since in a boot type delivery, the fuel injection flow rate never goes to zero between the respective fuel shots. Conversely, in a split fuel delivery, the fuel injection flow rate does go to zero between the respective fuel shots. As a result, more fuel is delivered in a boot type delivery as compared to a split fuel delivery. Even with more advanced electronically controlled injectors, during certain engine operating conditions it is still sometimes difficult to accurately control fuel delivery.

When dealing with split or multiple fuel injection and the general effects of a boot type fuel delivery and the fuel injection rate shaping which results therefrom, desired engine performance is not always achieved at all engine speeds and engine load conditions. Based upon operating conditions, the injection timing, fuel flow rate and injected fuel volume are desirably optimized in order to achieve minimum emissions and optimum fuel consumption. This is not always achieved in a split or multiple injection system due to a variety of reasons including limitations on the different types of achievable injection rate waveforms and the timing of the fuel injection shots occurring during the injection event. As a result, problems such as injecting fuel at a rate or time other than desired within a given injection event and/or allowing fuel to be injected beyond a desired stopping point can adversely affect emission outputs and fuel economy. From an emissions standpoint, either a split or boot fuel delivery may be preferable depending on the engine operating conditions.

In a system in which multiple injections and different injection waveforms are achievable, it is desirable to control and deliver any number of separate fuel injections to a particular cylinder so as to minimize emissions and fuel consumption based upon the operating conditions of the engine at that particular point in time. This may include splitting the fuel injection into more than two separate fuel shots during a particular injection event and/or adjusting the timing between the various multiple fuel injection shots in order to achieve the desired injector performance, that is, a split or a boot type fuel delivery, based upon the current operating conditions of the engine.

Due to limitations in the tolerances achievable during the injector manufacturing process, each injector has its own operating nuances. Therefore, to achieve the desired control of the performance characteristics of the fuel injectors in a given fuel injection system such as an internal combustion engine, it is advantageous to know the operating characteristics of each injector before it is installed into the fuel injection system.

Accordingly, the present invention is directed to overcoming one or more of the problems as set forth above.

DISCLOSURE OF THE INVENTION

In one aspect of the present invention, there is disclosed an electronically controlled fuel injection test system which is capable of simulating the operating characteristics of an internal combustion engine for the purposes of testing an injector before it is installed into an engine to determine and record for future use data associated with the operating characteristics of a fuel injector prior to installation into an engine. The tested injector is capable of delivering multiple fuel injections during a single injection event. For example, when three injections are desired, the first injection is known as a pilot shot, the second injection is known as a main shot and a third injection is known as an anchor shot.

An associated current signal pulse delivered by the test system controls initiation of each shot. A delay exists between the start of the current signal pulse and the start of the respective fuel injection or fuel shot initiated by the pulse due to the time necessary for the injector to respond to the control signal pulse. This delay, known as the start-ofcurrent start-of-injection delay (SOC/SOI), may vary in duration for each shot in an injection event.

An anchor signal delay separates the main and anchor pulses. If the anchor signal delay is of sufficient duration, it will yield a cessation in fuel flow for a period of time, thereby separating the main and anchor shots. This period of time is known as the anchor delay. If the anchor signal delay is not of sufficient duration, the fuel flow will not go to zero between the respective shots and a boot condition will occur.

The present system includes means for variably determining the number of fuel injections or fuel shots desired during a fuel injection event at given simulated engine operating conditions including at a pre-selected pilot, main and anchor fuel injection flow rate, a pre-selected pilot and main SOC/SOI delay, and an anchor delay. The present system also includes means for varying the timing and duration associated with the pilot, main and anchor shots, as well as the duration of the anchor delay.

Under certain operating conditions, the proximity of the main and anchor shots and the resultant internal injector hydraulics and/or mechanics leads to a rate shaping effect of the third or anchor injection. As a result, although the first or pilot injection, when used, is typically a distinct injection as compared to the second and third injections, a distinct third injection is not always apparent. The present invention enables determination as to whether a given injector is delivering a distinct third shot and, based upon considerations such as simulated engine performance, simulated minimization of emissions, injector durability and so forth, the present system adjusts the duration of the main current signal pulse and/or the anchor signal delay, if necessary, to achieve the desired injector performance. However, the techniques disclosed may be applied whenever two signals are located closely togther in time or distance.

These and other aspects and advantages of the present invention will become apparent upon reading the detailed description in connection with the drawings and appended claims.

BRIEF DESCRIPTION OF THE DRAWINGS

For a better understanding of the present invention, references may be made to the accompanying drawings in which.

BEST MODE FOR CARRYING OUT THE INVENTION

Figure 1:
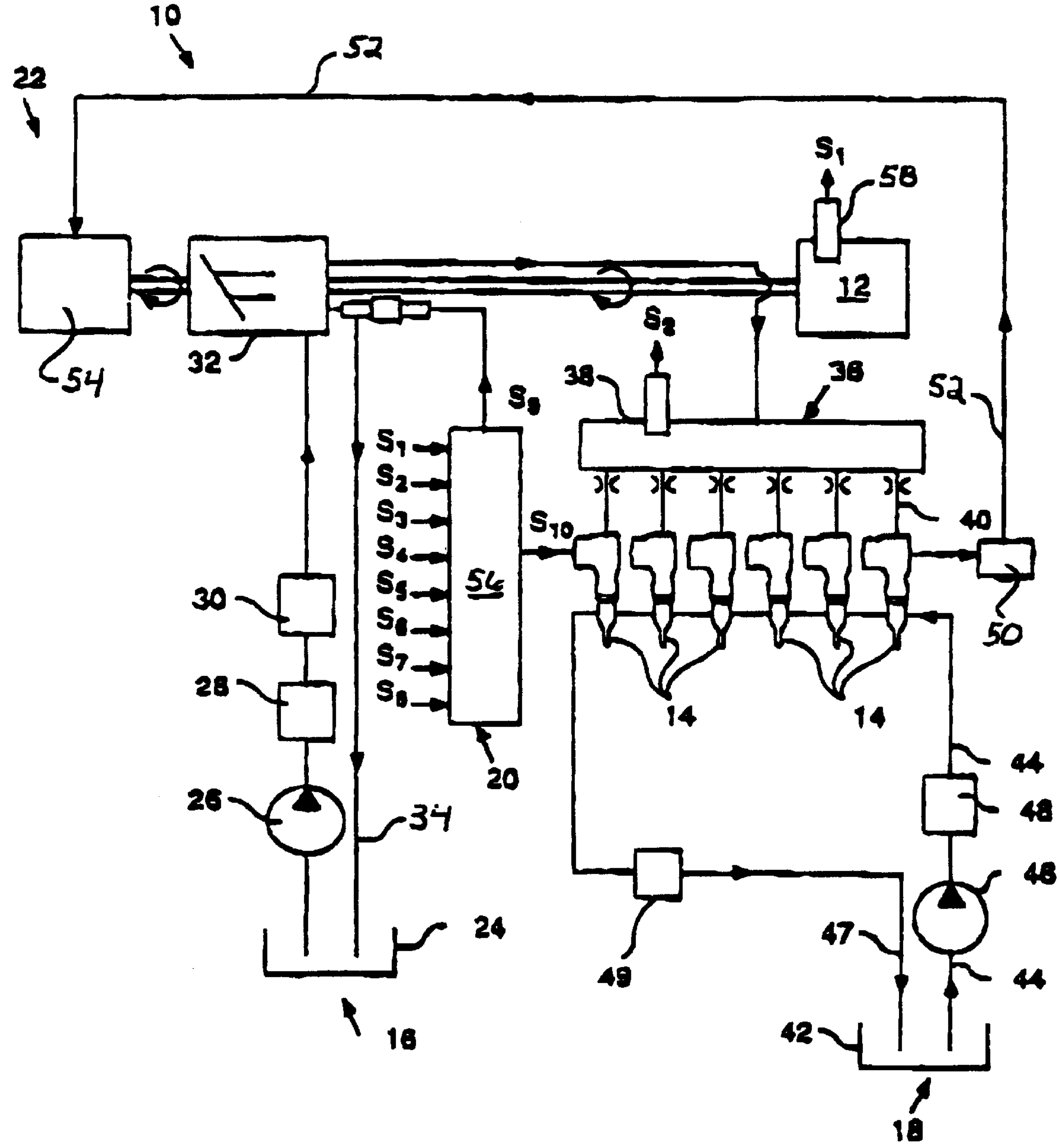
FIG. 1 is a typical schematic view of an electronically controlled injector fuel system used in connection with one embodiment of the present invention.

Referring to FIG. 1, there is shown one embodiment of a hydraulically actuated electronically controlled fuel injection system 10 in an exemplary configuration as adapted for a direct-injection compression ignition engine 12. Fuel system 10 includes one or more electronically controlled fuel injectors 14 which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuating fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high-pressure common rail passage 38.

The apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high-pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel.

The fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, the use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection including: (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) current level of the injector waveform, and (10) any combination of the above parameters. Each of such parameters is variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and so forth that are used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is input to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

It is recognized that the type of fuel injection desired during any particular fuel injection event will typically vary depending upon various engine operating conditions. In an effort to improve emissions, it has been found that delivering multiple fuel injections to a particular cylinder during a fuel injection event at certain engine operating conditions achieves both desired engine operation as well as emissions control.

Figure 2:
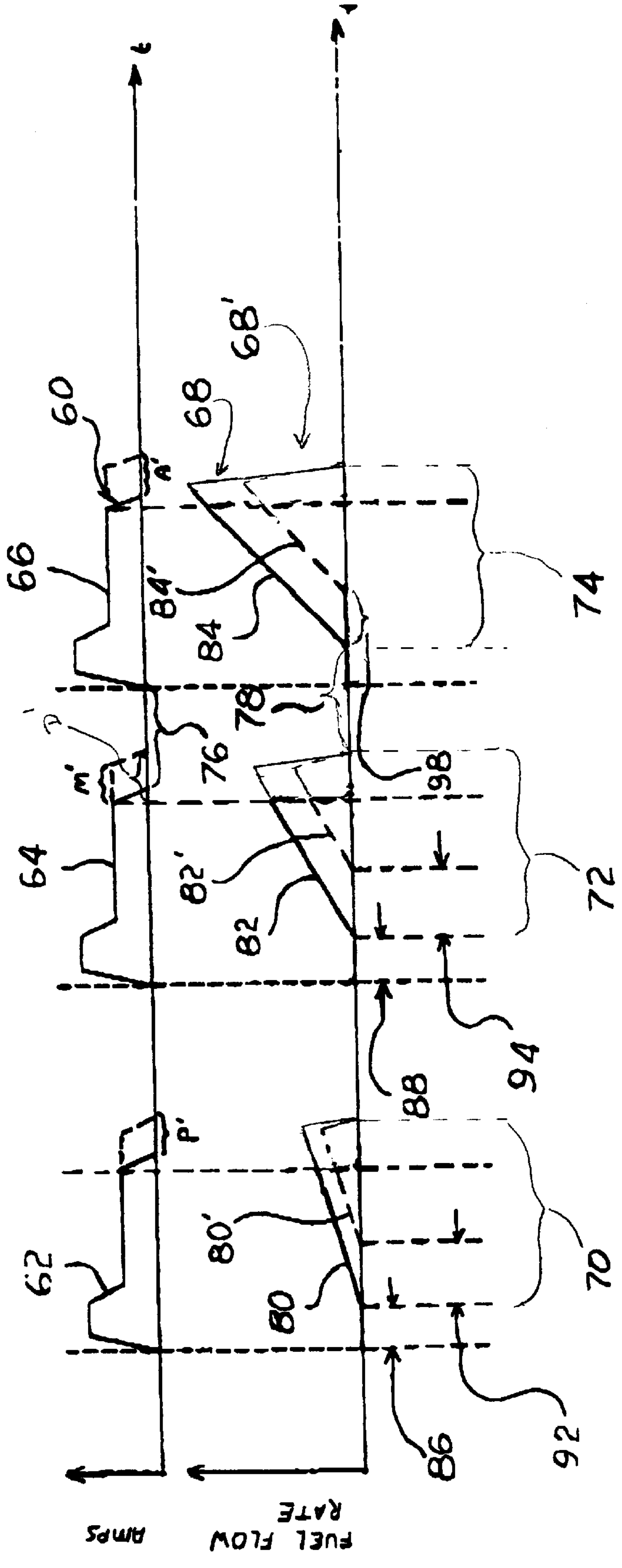
FIG. 2 is an exemplary schematic illustration of a current wave form sequentially aligned with a corresponding fuel injection rate trace and a corresponding offset fuel injection rate trace.

FIG. 2 shows a current wave trace or waveform 60 having a pilot current pulse 62, a main current pulse 64, and an anchor current pulse 66 sequentially aligned with a selected fuel flow rate trace profile 68 illustrating the fuel injection flow rate. The rate trace profile 68 includes a pilot shot duration 70 responsive to the pilot pulse 62, a main shot duration 72 responsive to the main pulse 64 and an anchor shot duration 74 responsive to the anchor pulse 66.

An anchor signal delay 76 separating the main and anchor pulse signals 64 and 66 produces a corresponding anchor delay 78 when the main and anchor shots 72 and 74 operate in a split condition, i.e., the fuel flow rate is negligible for the duration of the anchor delay 78, as illustrated in FIG. 2. Alternatively, the injector could function in a boot mode, yielding an anchor delay 78 of zero. In a generic sense, if only two shots are being utilized for example, they may be referred to as a first shot, a second shot, and the anchor delay may be referred to as a second shot delay.

The selected fuel flow rate trace 68 shows the selected pilot, main and anchor fuel flow rate profiles 80, 82 and 84, along with the predetermined pilot and main SOC/SOI delays 86 and 88, and an anchor delay 78. The area under the desired rate trace profile 68 is directly proportional to the volume of fuel desired to be injected during each shot 70, 72 and 74.

A representative actual fuel flow rate trace profile 68' is indicated in FIG. 2 by hatch marks shadowing the selected rate trace profile 68. The offset of the actual rate trace profile 68' from the selected rate trace profile 68 illustrates that the injector to be tested may, in operation, yield a pilot and main SOC/SOI offset 92 and 94, as well as an anchor delay offset 98, resulting in an actual pilot, main and anchor fuel flow rate profile 80', 82' and 84' having a reduced area relative to the selected pilot, main and anchor profiles 80,82 and 84, respectively. The anchor delay offset 98 may vary, dependent ton whether the EOI of the main fuel flow rate profile 82 differs from the EOI of the actual main fuel flow rate profile 82'. For example, if the EOI of the actual main fuel flow rate profile 82' occurs later in time than the EOI of the main fuel flow rate profile 82, then the anchor delay offset 98 will be increased by the time difference. The reduced area of the actual fuel flow rate profiles 80', 82', and 84', as compared to the pilot, main and anchor fuel flow rate profiles 80, 82, and 84, corresponds to a lower than desired volume of fuel being injected during each shot duration 70, 72 and 74. The duration of the pilot, main and anchor pulses 62, 64 and 66 can be increased by a pilot, main and anchor duration offset P', M' and A', respectively, to cause an increase in the amount of fuel injected during each shot 70, 72 and 74.

The present invention determines these operating characteristics of the injector 14. This data is then preserved to be utilized by an ECM of the engine into which the injector 14 is ultimately installed, thereby enabling the ECM to calibrate its electronic control signal to compensate for any undesirable operating characteristics of the injector 14. In one embodiment, the data is programmed into the ECM.

Figure 3A:
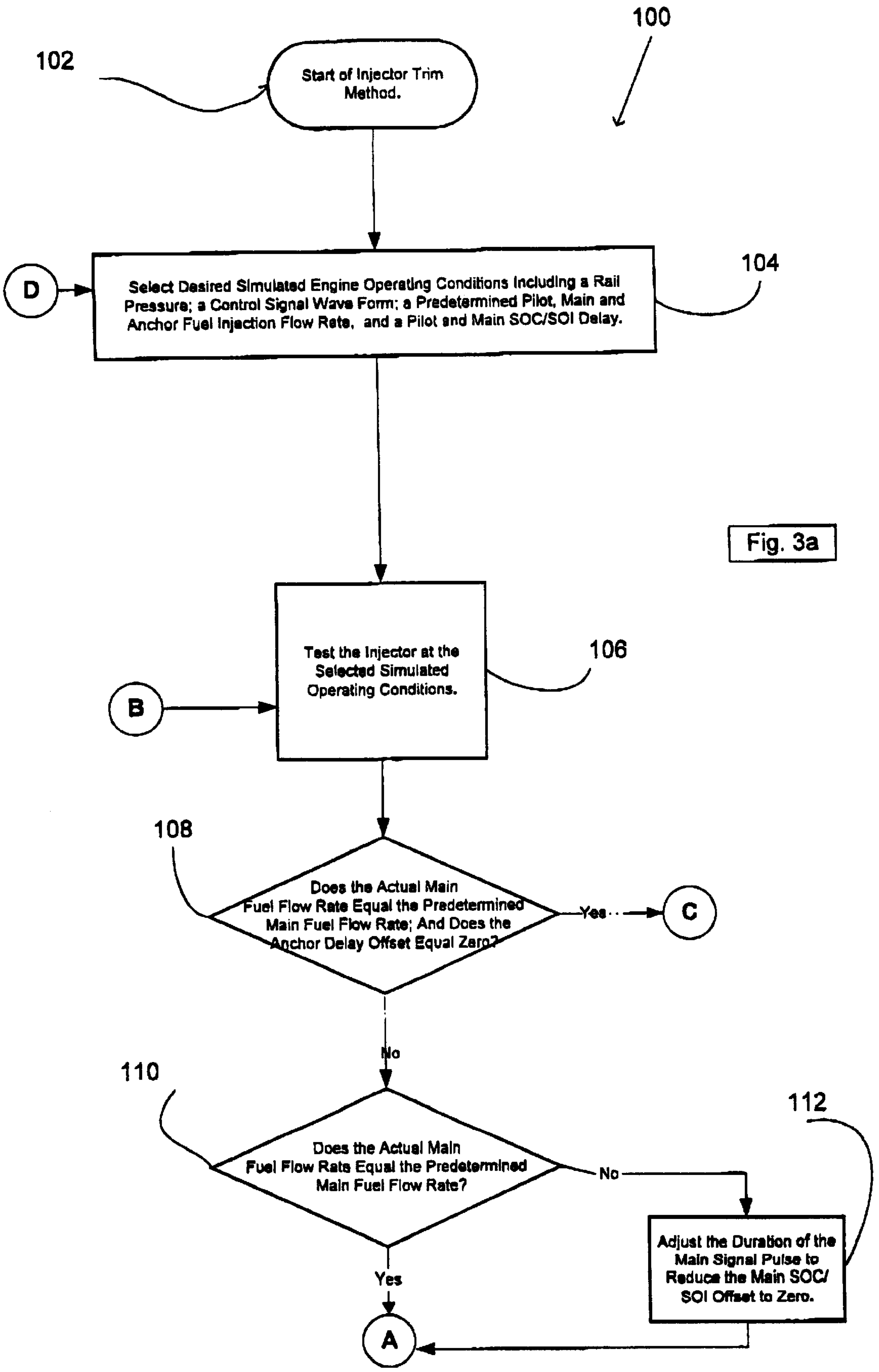
FIG. 3*a* is a first segment of a logic diagram showing the operation of the present invention.

The sequential process for trimming a fuel injector 14, i.e., for determining the operating characteristics of a given injector 14 and adjusting the electronic control signal as desired in accordance thereto, are illustrated by flowchart 100 having a first segment 102 shown in FIG. 3*a*.

A selected fuel injector (not shown), whose unique operating characteristics are to be determined by a fuel injection system simulator (not shown), is brought into electromechanical communication with the fuel injection system simulator. As shown in the flowchart at box 104, the desired simulated engine operating conditions are selected, such as those illustrated with regard to the flow rate trace 68'. The desired simulated engine operating conditions may include rail pressure, control signal waveform, selected pilot, main and anchor fuel injection flow rate 80,82 and 84, an anchor delay 78, and the pilot and main SOC/SOI delays 86 and 88.

The injector is then tested at the selected simulated operating conditions, as indicated in box 106. As illustrated by decision box 108, the system simulator determines a resulting actual fuel flow rate of the injector and compares it to the selected fuel flow rate. Referring back to FIG. 2, this is like comparing the actual fuel flow rate trace 68' to the selected fuel flow rate trace 68.

Figure 3B:
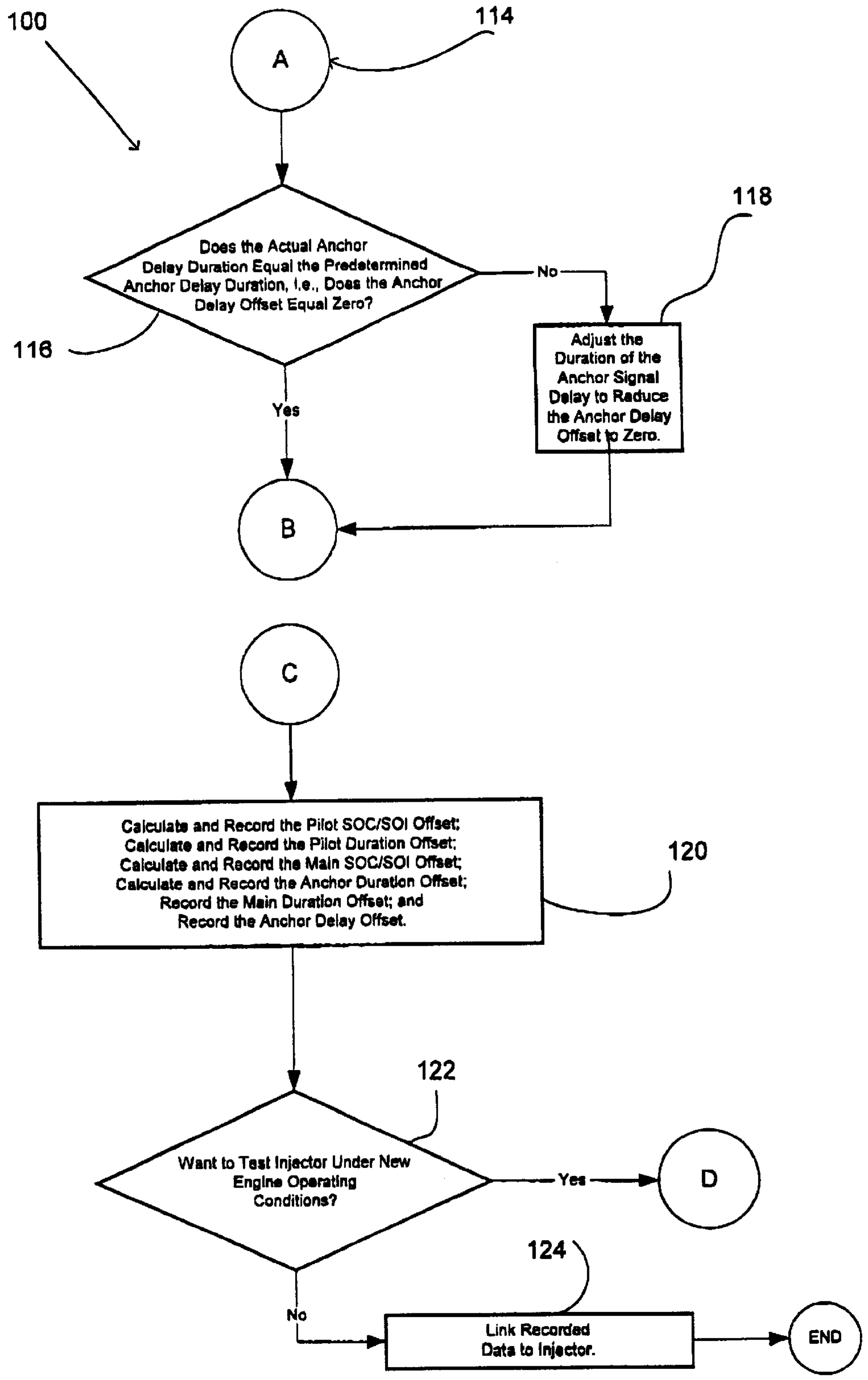
FIG. 3*b* is a second segment of a logic diagram showing the operation of the present invention.

As indicated by decision box 110, if the selected and actual main fuel flow rates 82 and 82' are not equal, the injection system simulator proceeds to box 112 and adjusts the duration of the main signal pulse 64 in accordance with the difference between the two fuel volumes and proceeds to box 116 of the second segment 114 of the flowchart 100, as shown in FIG. 3*b*. Conversely, if the actual main shot fuel volume equals the selected main shot fuel volume, the injection system simulator proceeds directly to box 116.

As illustrated by the decision box 116, the fuel injection system simulator next determines the actual anchor delay duration and compares it to the selected anchor delay duration 78. If the actual and selected anchor delay durations are not equal, the injection system simulator proceeds to box 118 and adjusts the duration of the anchor signal delay 76 in accordance with the difference between the two anchor delay durations to reduce the anchor delay offset 98 to be at or near zero, and returns to box 106 shown in the first segment 102 of the flowchart 100. Conversely, if the actual anchor delay duration equals the selected anchor delay duration 78, the fuel injection system simulator returns directly to box 106. Thereupon, the adjusted injector is re-tested.

Once the fuel injection system simulator determines, at step 108, that the actual main injection fuel flow rate 82' equals the selected main injection fuel flow rate 82, and that the anchor delay offset 98 is equal to zero, data relating to specific performance characteristics unique to the injector is obtained by the injection system simulator that, when programmed into the electronic control module of the engine into which the injector will ultimately be inserted, will enable the electronic control module to trim the injector, i.e., to calibrate its control signal in accordance with the injector performance data to yield improved engine performance. The fuel injection system simulator then proceeds to box 120, whereupon the simulator calculates, via methods known in the art, and records the trim parameters, including the pilot SOC/SOI offset duration 92, the pilot duration offset P', the main SOC/SOI offset duration 94, and the anchor duration offset A'. The simulator further records the already calculated main duration offset M' and anchor signal delay offset D trim parameters.

The fuel injection system simulator then ascertains whether it is desirable to repeat the entire process of the flowchart 100 for new simulated engine operating conditions, as shown in box 122. If so, the simulator returns to box 104. If not, the test is concluded and, as shown in box 124, the recorded data is linked to the injector for future reference when the injector is installed into an engine.

FIG. 2 and the associated discussion have been directed towards an injection event having a pilot, main and anchor signal. However the same discussion, and analogous procedures apply when an injection event only has two injections, such as a main and anchor injection, or a pilot and main injection, or a pilot and anchor injection.

Industrial Applicability

Utilization of a method and apparatus in accordance with the present invention for determining the operational characteristics of a fuel injector and recording the operational characteristics for use by an ECM (not shown) of an engine into which the injector is ultimately installed, thereby enabling the ECM to calibrate its electronic control signal in accordance with the recorded operational characteristics of the injector, will yield improved emission control during certain engine operating conditions as explained above. Although a particular injection waveform for delivering multiple fuel injections may vary according to the type of injector being trimmed and the particular simulated engine operating conditions selected, the present system is capable of successfully trimming an injector regardless of the type of electronically controlled fuel injectors being utilized, and regardless of the type of fuel being utilized. In this regard, appropriate fuel maps relied upon by the fuel injection system simulator can be stored or otherwise programmed into an electronic control module (not shown) in electrical communication with the simulator. These operational maps, tables and/or mathematical equations stored in a programmable memory of the electronic control module determine and control the various parameters associated with the appropriate multiple injection events to achieve desired emissions control.

It is recognized that variations to the steps depicted in the flowchart 100 (FIGS. 3*a* and 3*b*) could be made without departing from the spirit and scope of the present invention. In particular, steps could be added or some steps could be eliminated. All such variations are intended to be covered by the present invention.

As is evident from the foregoing description, certain aspects of the present invention are not limited by the particular details of the examples illustrated herein and it is therefore contemplated that other modifications and applications, or equivalencies thereof, will occur to those skilled in the art. It is accordingly intended that the claims shall cover all such modifications and applications that do not depart from the spirit and scope of the present inventions.

Other aspects, objects and advantages of the present invention can be obtained from a study of the drawings, the disclosure and the appended claims.

What is claimed is:

1. A method for trimming a fuel injector in electromechanical communication with a fuel injection system simulator, the injector being operable to generate, in one injection event, a first and second shot and produce an second shot delay in response to an electronic control signal delivered by the simulator, the control signal generating a respective, first and second signal pulse and an second signal delay, the method comprising the steps of:

selecting operating conditions of the fuel injection system simulator;

testing the injector at the selected operating conditions;

detecting the actual operating conditions of the injector;

comparing the actual operating conditions to the selected operating conditions; and adjusting parameters of the electronic control signal if the actual operating conditions do not equal the selected operating conditions.

2. A method, as set forth in claim 1, further comprising the step of re-testing the injector, re-detecting the actual operating conditions, re-comparing the actual operating conditions to the selected operating conditions, and re-adjusting the parameters of the electronic control signal until the actual operating conditions are substantially equal to the selected operating conditions.

3. A method, as set forth in claim 1, further comprising the step of calculating and recording trim parameters of the electronic control signal.

4. The method, as set forth in claim 1, wherein the step for selecting the operating conditions includes selecting a volume of fuel to be injected during the main shot and selecting an second shot delay duration.

5. The method, as set forth in claim 4, wherein the step for detecting the actual operating conditions includes detecting the actual volume of fuel injected during the first shot and detecting the actual second shot delay.

6. The method, as set forth in claim 5, wherein the step for comparing the actual operating conditions to the selected operating conditions includes comparing the actual volume of fuel injected during the first shot to the selected volume of fuel to be injected during the first shot, and comparing the actual second shot delay duration to the selected second shot delay duration.

7. The method, as set forth in claim 6, wherein the step for adjusting the parameters of the electronic control signal includes selectively adjusting the duration of the first shot signal pulse and selectively adjusting the duration of the second shot signal delay.

8. The method, as set forth in claim 7, including the step of linking the recorded trim parameters to the injector.

9. The method, as set forth in claim 8, including the step of programming the recorded trim parameters into an electronic control device operable to generate an electronic control signal to an engine in electrical communication therewith.

10. The method, as set forth in claim 9, including the step of functionally inserting the injector into the engine for operation therewith.

11. A method for trimming a fuel injector in electromechanical communication with a fuel injection system simulator, the injector being operable to generate, in one injection event, main and anchor shot and produce an anchor delay in response to an electronic control signal delivered by the simulator, the control signal generating a respective main and anchor signal pulse and an anchor signal delay, the method comprising the steps of:

selecting operating conditions of the fuel injection system simulator including selecting a volume of fuel to be injected during the main shot by the fuel injection system simulator and including selecting an anchor delay duration;

testing the injector at the selected operating conditions of the fuel injection system simulator;

detecting an actual volume of fuel injected during the main shot;

comparing the actual volume of fuel injected during the main shot to the selected volume of fuel to be injected during the main shot;

selectively adjusting the duration of the main signal pulse if the actual volume of fuel injected during the main shot is not substantially equal to the selected volume of fuel to be injected during the main shot;

detecting an actual anchor delay duration;

comparing the actual anchor delay duration to the selected anchor delay duration; and selectively adjusting the duration of the anchor signal delay if the actual anchor delay duration is not substantially equal to the selected anchor delay duration.

12. A method, as set forth in claim 11, further comprising the step of re-testing the injector, re-detecting the actual volume of fuel injected during the main shot, re-comparing the actual volume of fuel injected during the main shot to the selected volume of fuel to be injected during the main shot, re-adjusting the duration of the main signal pulse, re-detecting the actual anchor delay duration, re-comparing actual anchor delay duration to the selected anchor delay duration, and re-adjusting the duration of the anchor signal delay until resultant electronic control signal parameters cause the actual volume of fuel injected during the main shot to be substantially equal to the selected volume of fuel to be injected during the main shot, and the actual anchor delay duration to be substantially equal to the selected anchor delay duration.

13. A method, as set forth in claim 11, further comprising the step of calculating and recording the resultant electronic control signal parameters.

14. A fuel injection system simulator for trimming a fuel injector in electromechanical communication therewith, the simulator comprising:

input means for selecting simulated operating conditions at which to test the injector;

retention means for removably retaining the injector in electromechanical communication with the simulator; and an electronic controller in electrical communication with the injector and operable to deliver a control signal to the injector during test; to detect actual operating conditions of the injector during test; to compare the actual operating conditions with the selected operating conditions; to adjust predetermined parameters of the control signal when the actual operating conditions are not substantially equal to the selected operating conditions; to re-test the injector, re-detect the actual operating conditions of the injector, re-compare the actual operating conditions with the selected operating conditions, and re-adjust the predetermined parameters of the control signal until the actual operating conditions are substantially equal to the selected operating conditions; and to record the adjusted parameters of the control signal.

15. The fuel injection system simulator, as set forth in claim 14, wherein the injector generates a main shot and produces an anchor delay in response to the electronic control signal.

16. The fuel injection system simulator, as set forth in claim 15, wherein the electronic control signal includes a main signal pulse and an anchor signal delay.

17. The fuel injection system simulator, as set forth in claim 16, wherein the input means include means for selecting a volume of fuel to be injected during the main shot and means for selecting an anchor delay duration.

18. The fuel injection system simulator, as set forth in claim 17, wherein the electronic controller detects the actual volume of fuel injected during the main shot and detects the actual anchor delay duration.

19. The fuel injection system simulator, as set forth in claim 18, wherein the electronic controller compares the actual volume of fuel injected during the main shot to the selected volume of fuel to be injected during the main shot, and compares the actual anchor delay duration to the selected anchor delay duration.

20. The fuel injection system simulator, as set forth in claim 19, wherein the electronic controller selectively adjusts the duration of the main signal pulse if the actual volume of fuel injected during the main shot is not substantially equal to the selected volume of fuel to be injected during the main shot, and selectively adjusts the duration of the anchor signal delay if the actual anchor delay duration is not substantially equal to the selected anchor delay duration.

* * * * *